(12) United States Patent
Poemmerl

(10) Patent No.: US 11,031,721 B2
(45) Date of Patent: Jun. 8, 2021

(54) INTERFACE UNIT FOR A PLUG SYSTEM HAVING TYPE CODING

(71) Applicant: Bayerische Motoren Werke Aktiengesellschaft, Munich (DE)

(72) Inventor: Josef Poemmerl, Furth (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/220,971

(22) Filed: Dec. 14, 2018

(65) Prior Publication Data

US 2019/0123473 A1    Apr. 25, 2019

Related U.S. Application Data

(63) Continuation of application No. PCT/EP2017/064394, filed on Jun. 13, 2017.

(30) Foreign Application Priority Data

Jun. 16, 2016  (DE) .................... 10 2016 210 722.4

(51) Int. Cl.
  *H01R 9/05*    (2006.01)
  *H01R 13/46*   (2006.01)
  *H01R 13/64*   (2006.01)
  *B60L 53/16*   (2019.01)

(52) U.S. Cl.
  CPC ............ *H01R 13/465* (2013.01); *B60L 53/16* (2019.02); *H01R 13/64* (2013.01); *H01R 2201/26* (2013.01)

(58) Field of Classification Search
  CPC ...... H01R 17/12; H01R 24/40; H01R 17/125; H01R 13/5219

USPC ................................ 439/578, 675, 581, 271
See application file for complete search history.

(56) References Cited

U.S. PATENT DOCUMENTS

| | | | |
|---|---|---|---|
| 4,947,568 A | 8/1990 | De Barbieri | |
| 6,409,392 B1 | 6/2002 | Lampert et al. | |
| 2015/0194765 A1* | 7/2015 | Yu ...................... | H01R 13/629 |
| | | | 439/372 |

FOREIGN PATENT DOCUMENTS

| | | |
|---|---|---|
| CN | 101299502 A | 11/2008 |
| CN | 105655790 A | 6/2016 |
| CN | 105723571 A | 6/2016 |
| DE | 10 2014 200 133 A1 | 7/2015 |
| EP | 0 035 460 A1 | 9/1981 |

(Continued)

OTHER PUBLICATIONS

PCT/EP2017/064394, International Search Report dated Jul. 19, 2017 (Three (3) pages).

(Continued)

*Primary Examiner* — Phuong Chi Thi Nguyen
(74) *Attorney, Agent, or Firm* — Crowell & Moring LLP

(57) ABSTRACT

A cable-side interface unit for a plug system for transmitting electrical power in a high-voltage electrical system of a vehicle includes a housing configured to at least partially extend around one or more power contact parts of the cable-side interface unit and to fasten a cable to the cable-side interface unit. The interface unit also comprises colored and/or physical type coding means, which are arranged on an outer wall of the housing and make it possible to identify a certain component-side interface unit of the plug system from a plurality of different component-side interface units of the electrical system.

7 Claims, 2 Drawing Sheets

(56) References Cited

FOREIGN PATENT DOCUMENTS

| EP | 1 128 487 A2 | 8/2001 |
|---|---|---|
| EP | 1 577 986 A1 | 9/2005 |
| EP | 1 988 611 A1 | 11/2008 |
| GB | 688990 | 3/1953 |
| GB | 2 304 238 A | 3/1997 |
| JP | 2-51050 A | 2/1990 |
| JP | 2015-111536 A | 6/2015 |
| WO | WO 2015/047527 A1 | 4/2015 |

OTHER PUBLICATIONS

German Search Report issued in German counterpart application No. 10 2016 210 722.4 dated Jul. 29, 2019, with Statement of Relevancy (Eleven (11) pages).

Mennekes Elektrotechnik GmbH & Co. KG, Industriesteckvorrichtungen (Auszag)., 2015, URL: https://www.terratec.ch/wp-content/uploads/2016/07/Mennekes_Hauptkatalog.pdf, Fifteen (15) total pages.

Chinese Office Action issued in Chinese counterpart application No. 201780037048.1 dated Sep. 30, 2019, with English translation (Eighteen (18) pages).

Chinese Office Action issued in Chinese application No. 201780037048.1 dated Aug. 24, 2020, with English translation (Seventeen (17) pages).

* cited by examiner

INTERFACE UNIT FOR A PLUG SYSTEM HAVING TYPE CODING

CROSS REFERENCE TO RELATED APPLICATIONS

This application is a continuation of PCT International Application No. PCT/EP2017/064394, filed Jun. 13, 2017, which claims priority under 35 U.S.C. § 119 from German Patent Application No. 10 2016 210 722.4, filed Jun. 16, 2016, the entire disclosures of which are herein expressly incorporated by reference.

BACKGROUND AND SUMMARY OF THE INVENTION

The invention relates to a plug system and in particular to an interface unit for a plug system for an electric high-voltage connection.

A vehicle with an electric drive comprises an on-board electric power system in which so-called high-voltage or hazardous voltage (HV) components are able to be coupled to one another via plug connections. By way of example, an electrical energy store of the HV on-board power system may be connected to a cable of a cable harness of the HV on-board power system via a plug connection.

Such a plug connection comprises HV lines (e.g. a positive line and a negative line in the case of a DC current plug connection or a phase line and a neutral line in the case of a single-phase AC current plug connection or three phase lines and a neutral line in the case of a three-phase AC current plug connection) for transmitting electric power from a component or to a component. Furthermore, such a plug connection may comprise one or more signal lines or safety lines that are able to be used to detect the state of the plug connection. In particular, a signal line (in particular an HVIL line) may be used to recognize that a plug connection has been interrupted. In response to this, the current transmission may then be interrupted on the HV lines (even before the plug connection is ultimately disconnected). The safety of HV plug connections may thus be increased.

In an HV on-board power system, multiple plug connections are typically installed. The present document is concerned with the technical objective of providing plug systems for an HV on-board power system of a vehicle, which plug systems allow simple, reliable and correct installation of the plug connections of the HV on-board power system.

According to one aspect, a cable-side interface unit for a plug system for transmitting electric power in an on-board power system, in particular in a high-voltage on-board power system, of a vehicle is described. The plug system in this case comprises the cable-side interface unit and a specific component-side interface unit that are able to be plugged together to produce a plug connection for transmitting electric power. The component-side interface unit may be connected e.g. to a component (e.g. to an energy store, an electrical consumer and/or to a generator) of the on-board power system. A component of the on-board power system may thus be connected to a cable harness of the on-board power system via the plug system.

The cable-side interface unit comprises power contact parts for transmitting electric power and for making contact with corresponding power contact parts of the specific component-side interface unit. By way of example, the cable-side interface unit may be configured as a plug and the component-side interface unit as a socket. The number of power contact parts typically depends on whether a DC current or a single-phase or multiphase AC current is intended to be transmitted.

The cable-side interface unit comprises a housing that is designed to at least partly enclose the power contact parts of the cable-side interface unit. In particular, the housing may be configured as a cylinder that encloses the power contact parts by way of its surface.

The housing is furthermore designed to fix a cable to the cable-side interface unit. The cable in this case has lines that are electrically conductively connected to the power contact parts of the cable-side interface unit inside the housing.

The cable-side interface unit furthermore comprises colored and/or physical (or mechanical) type coding means that are arranged on an outer wall of the housing and make it possible to identify the specific component-side interface unit of the plug system from a multiplicity of different component-side interface units of the on-board power system. Providing type coding means that are arranged externally on the housing allows an installer, when installing the on-board power system, to assign the cable-side interface units of a cable harness to the different component-side interface units of the on-board power system in a simple and reliable manner. The plug connections of an on-board power system are thus able to be produced in a simple and reliable manner.

Typically, a component-side interface unit has colored and/or physical type coding means that correspond to the colored and/or physical type coding means of the cable-side interface unit. By way of example, the interface units of a plug system may have identical color coding and/or identical physical features in order to allow an installer, when installing the on-board power system, to identify the cable-side and the component-side interface unit of a plug system.

The colored and/or physical (or mechanical) type coding means may comprise coloring of at least part of the housing. In particular, the housing may be formed from a plurality of components. At least one of the components may then be colored in a specific way so as to provide type coding. By coloring part of the housing, it is possible to provide different type coding for different interface units in an efficient manner.

The housing may e.g. comprise fixing means for fixing the cable to the cable-side interface unit. The fixing means may e.g. be designed to clamp the cable to a cable-side end of the housing. The fixing means may in this case comprise at least one or more separate components. The colored and/or physical type coding means may then be arranged on the fixing means in an efficient manner.

Particularly advantageously, the fixing means may have two cones that are plugged into one another and have a complementary profile along a direction of extent of the cable. The colored and/or physical type coding means may then be arranged on at least one of the cones. By way of example, the inner wall of the housing may enclose the cable at the cable-side end of the housing and the two cones may comprise an outer cone and an inner cone. The outer wall of the outer cone may bear on the inner wall of the housing, whereas the inner wall of the outer cone widens toward the cable-side end of the housing. On the other hand, the inner wall of the inner cone may bear on the outer wall of the cable, whereas the outer wall of the inner cone runs in a manner complementary to the inner wall of the outer cone, such that a press fit is formed between the cable and the housing when the inner cone is inserted into the outer cone.

The inner cone may in particular have an externally visible ring that encloses the cable. The colored and/or physical type coding means may then advantageously be arranged on the ring.

As an alternative or in addition, the colored and/or physical type coding means may comprise a specific shape of the housing and/or a specifically shaped and/or colored structure (e.g. an attachment) on the housing.

The housing and the power contact parts of the cable-side interface unit typically form a first space that is enclosed by the housing and open toward a front side of the cable-side interface unit and that corresponds to an open second space of the specific component-side interface unit so as to produce the plug connection. In other words, the housing and the power contact parts of the cable-side interface unit may form a first spatial profile (that is typically enclosed by the housing) that interacts with a corresponding second spatial profile of the specific component-side interface unit so as to form the plug connection.

A shape of the open first space or of the first spatial profile may then form physical type coding, such that the cable-side interface unit is not able to produce a plug connection with other interface units of the multiplicity of different component-side interface units. In particular, different pairs of cable-side interface units and of corresponding component-side interface units may have differently shaped open spaces or spatial profiles, such that plug connections are not able to be formed between non-corresponding interface units. Reliable and correct installation of the on-board power system of a vehicle is thus able to be ensured.

As an alternative or in addition, colored type coding may be arranged inside the open first space or the first spatial profile (e.g. corresponding to the colored type coding means on the outer wall of the housing, in particular having a corresponding color). Such colored type coding allows an installer to recognize the type of cable-side interface unit when he looks at the front side of the cable-side interface unit (e.g. in order to view the shape of the open first space or of the first spatial profile). On the other hand, such movement of the cable-side interface unit may possibly damage the cable that is connected therein, meaning that identification on the basis of the colored type coding means arranged on the outer wall of the housing is typically advantageous for simple installation of an on-board power system.

According to a further aspect, a method for checking a cable harness for an on-board power system of a vehicle is described. The cable harness in this case comprises a multiplicity of cables and a corresponding multiplicity of different cable-side interface units that may be configured as described in this document. In this case, the different cable-side interface units have different colored and/or physical type coding means.

The method comprises acquiring image data in relation to the colored and/or physical type coding means of the multiplicity of different cable-side interface units (e.g. by way of an image camera). In addition, the method comprises detecting an error in the cable harness on the basis of the image data. Checking a cable harness on the basis of image data is made possible in particular through the provision of colored and/or physical type coding means that are arranged in a manner externally visible on the housings of the different cable-side interface units.

The colored and/or physical type coding means of a cable-side interface unit may in each case comprise at least a colored type coding means and a physical type coding means that together form a pair of coding means. Detecting an error in the cable harness may then comprise detecting an incorrect pair of coding means in which a colored type coding means does not match the physical type coding means. The detection rate of manufacturing errors in the production of a cable harness may thus be further improved.

According to a further aspect, a vehicle (in particular a motorized road vehicle, e.g. a passenger vehicle, a truck or a motorcycle) is described, which vehicle comprises the on-board power system described in this document or the plug system described in this document or the interface unit described in this document.

It should be borne in mind that the methods, devices and systems described in this document may be used either alone or in combination with other methods, devices and systems described in this document. Furthermore, any aspects of the methods, devices and systems described in this document may be combined with one another in a great many ways. In particular, the features of the claims may be combined with one another in a great many ways.

Other objects, advantages and novel features of the present invention will become apparent from the following detailed description of one or more preferred embodiments when considered in conjunction with the accompanying drawings.

BRIEF DESCRIPTION OF THE DRAWINGS

The invention is described in more detail below with reference to exemplary embodiments, in which.

DETAILED DESCRIPTION OF THE DRAWINGS

Figure 1:
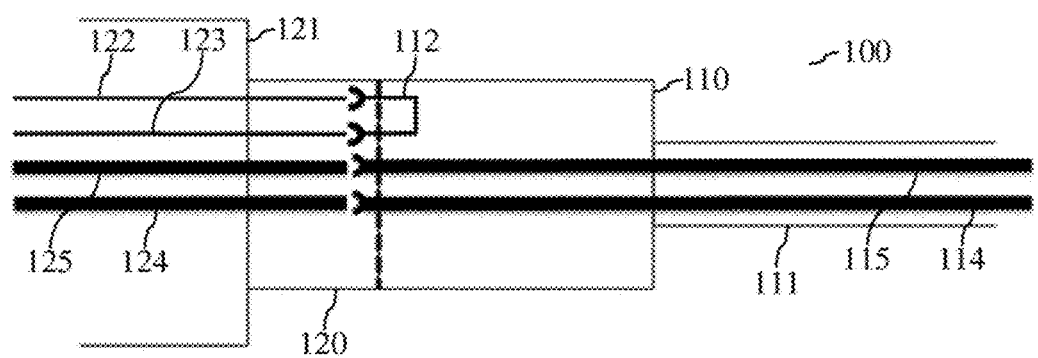
FIG. 1 shows an exemplary plug system with HV interlock function.

As explained at the outset, the present document is concerned with providing a plug system for an HV on-board power system of a vehicle that allows simple and reliable installation of plug connections. In this context, FIG. 1 shows an exemplary plug system 100 with a cable-side interface unit 110 (e.g. with a plug) and a component-side interface unit 120 (e.g. with a socket). The cable-side interface unit 110 is fixedly connected to a cable 111 that comprises two or more HV lines 114, 115. In particular, HV contact parts of the cable-side interface unit 110 are connected to the HV lines 114, 115. The component-side interface unit 120 is fixedly connected to the corresponding two or more HV lines 124, 125 of the component 121 of the on-board power system. In particular, HV contact parts of the component-side interface unit 120 are connected to the HV lines 124, 125. The interface units 110, 120 thus comprise two or more contact parts by way of which the corresponding HV lines 114, 124 and 115, 125 are able to be connected to one another. The voltage in the HV on-board power system may be e.g. 300 V, 400 V or more.

The component 121 and the component-side interface unit 120 may furthermore comprise signal lines 122, 123 (e.g. 12 V lines) that are able to be electrically conductively connected to one another via a signal bridge 112 in the cable-side interface unit 110. The creation or disconnection of an electrically conductive connection between the signal lines 122, 123 via the signal bridge 112 may be detected by a control unit (not shown) for the component 121 and/or a further component of the vehicle. The signal loop formed by the signal lines 122, 123 and the signal bridge 112 is in this case typically configured such that, even before the electrically conductive HV connections between the HV powers 114, 124 or 115, 125 are disconnected, the electrically conductive signal connection between the signal lines 122, 123 is interrupted. A flow of current through the HV powers 114, 124 or 115, 125 is thus already able to be suppressed early.

The on-board power system of a vehicle typically comprises a multiplicity of components (e.g. one or more energy stores, one or more electrical consumers and/or one or more generators) that are connected to one another via electrical cables. As a result of this, a multiplicity of plug systems 100 are typically used in an on-board power system in order to electrically conductively connect the components of the on-board power system to one another via cables of a cable harness. It is thus possible to provide a cable harness that has a multiplicity of cables 111 with a corresponding multiplicity of cable-side interface units 110. During installation, an installer has to assign the multiplicity of cable-side interface units 110 to a corresponding multiplicity of component-side interface units 120 in order to produce correct plug connections. In the process, mistakes may be made that may impair the operation of the on-board power system.

Figure 2:
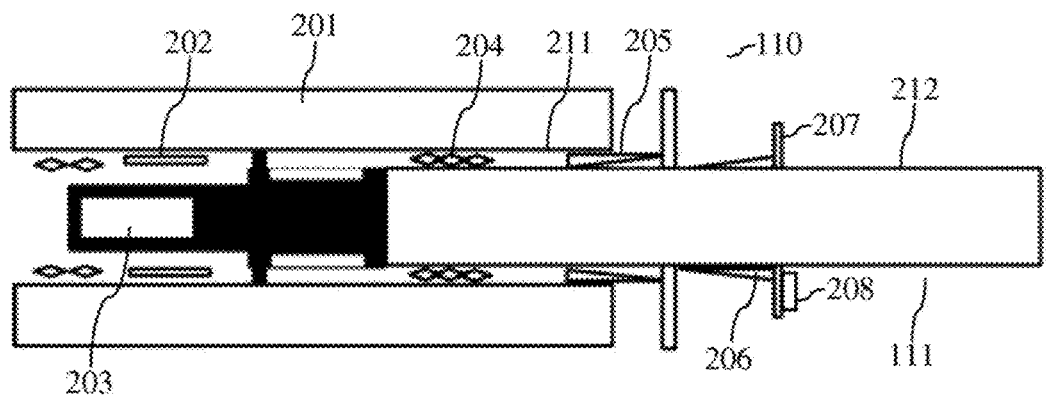
FIG. 2 shows an exemplary cable-side interface unit with externally visible type coding.

In order to avoid mistakes during installation, colored and/or physical type coding may be used that allows an installer to identify the correct pairs of interface units 110, 120 of a plug system 100. FIG. 2 shows an exemplary cable-side interface unit 110 with colored and/or physical type coding. The interface unit 110 comprises a housing 201 that encloses one or more contact parts 203 of the interface unit 110. The one or more contact parts 203 may e.g. be configured as socket contacts or pins.

Furthermore, the interface unit 110 may comprise coding means 202 that make it possible to identify a type of interface unit 110 or a type of plug connection to be produced with the interface unit 110. The contact parts 203 (on a contact carrier) and the housing 201 may have a profile that interacts with the profile of a component-side interface unit 120 of the plug system 100. The profile of the interface unit 110 may in this case be used as physical coding means. In particular, different plug systems 100 of an on-board power system may have different plug profiles, such that the creation of incorrect plug connections is reliably able to be avoided.

As an alternative or in addition, the coding means 202, as illustrated in FIG. 2, may comprise color coding arranged between the housing 201 and the contact parts 203 (that is to say inside the plug profile). By way of example, different plug systems 100 of an on-board power system may use different colors (e.g. black, white, blue, purple, green, brown, aquamarine, etc.).

The coding means 202 described above are coding means 202 that an installer is only able to recognize when he turns the cable-side interface unit 110 toward himself in order to be able to see the plug profile and/or the color coding between the housing 201 and the contact parts 203. In doing this, a maximum permissible degree of bending of the cable 111 may be exceeded and the cable 111 or a connection between the cable 111 and the interface unit 110 may thus be impaired.

The cable-side interface unit 110 may therefore advantageously comprise coding means 207, 208 that are externally visible to an installer. In particular, in this case, means for fixing the cable 111 to the cable-side interface unit 110 may be used in order to make the type of interface unit 110 or the plug connection to be produced thereby recognizable.

In FIG. 2, the cable 111 is routed into the housing 201 of the interface unit 110 and connected to the one or more contact parts 203 inside the housing 201. In this case, it is possible to use gaskets 204 in order to seal the individual strands or lines 114, 115 of the cable 111. The cable 111 may be fixed to the end side of the housing 201 facing the cable 111 by way of two cones 205, 206 running opposite one another. In particular, an outer cone 205 may be introduced between the housing inner wall 211 and outer wall 212 of the cable 111, the diameter of the outer cone 205 increasing toward the end side of the housing 201 in order to create a receptacle for the inner cone 206 that has a diametric profile opposing the outer cone 205. The outer cone 205 and the inner cone 206 may then be inserted above one another and thus wedged, so as to fix the cable 111 to the housing 201 of the interface unit 110.

As shown in FIG. 2, the inner cone 206 has a ring 207 running around the cable 111, where the ring is externally visible. The ring 207 may be color-coded in order to make the type of interface unit 110 or of plug connection to be produced externally recognizable. As an alternative or in addition, the ring 207 may have physical coding (e.g. an elevation or a recess 208).

Figure 3:
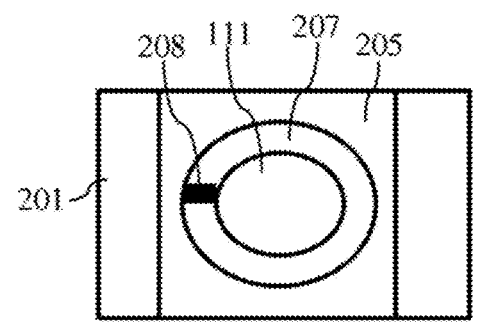
FIG. 3 shows a rear view of the cable-side interface unit from FIG. 2.

FIG. 3 shows a plan view of the cable-side end side of the housing 201 of the interface unit 110. In particular, FIG. 3 in this case shows an end side of the outer cone 205, the possibly color-coded ring 207 of the inner cone 206, exemplary physical coding 208 of the ring 207, and the cable 111.

FIGS. 2 and 3 thus show a cable-side interface unit 110 with colored and/or physical coding means 207, 208 that are able to be recognized by an installer in any installation situation without having to twist the cable-side interface unit 110 in order to achieve this. The coding means 207, 208 are arranged on an outer wall of the housing 201 or on a retaining cap of the interface unit 110. In particular, the coding means 207, 208 may be arranged on the means 205, 206 for fixing the cable 111 to the interface unit 110. Color coding may in this case be brought about by the (possibly complete or partial) coloring of a component (e.g. of the inner cone 206). As an alternative or in addition, an appropriate colored additional element may be attached to the housing 201 of the interface unit 110. An additional element in this case advantageously meets the same mechanical requirements and environmental requirements as the interface unit 110.

As already explained above, in HV plug systems, colored coding recognition 202 inside the housing 201 is typically not visible in all situations on account of the construction of the cable-side interface unit 110 (waterproof design, corrosion protection, etc.) during the installation of an on-board power system. This may lead to a situation whereby the installer of an on-board power system has to make several attempts at plugging when there is more than one plugging possibility present. This leads to wasted time in the installation. Furthermore, the installer may possibly exceed an admissible bending radius on the cable 111, which may lead to damage of the cable 111 and possibly to a failure in the vehicle.

The (optional) external color coding 207 described in this document allows an installer to identify the correct interface unit 110 (that is to say the correct plug) reliably and quickly and to plug it into the correct position (that is to say into the correct interface unit 120). In this case, the (optional) external color coding 207 may advantageously be implemented by a cone component 206 (part of an integrated line fixing system on the plug) or by a clip element or in another way.

In order that the manufacturer of a cable harness is able to check the cable harness in a reliable and cost-effective manner in an end of line test, a mechanical or physical difference or type coding may additionally be arranged on the external color coding (e.g. binary pins/holes/etc.). The cable harness is thus able to be checked on the basis of the mechanical or physical type coding.

During the manufacture of a cable harness and the attachment of the coding means 207, 208, camera-based monitoring and evaluation of image data may take place in order to avoid incorrect attachment of coding means 207, 208. Both colored and physical coding means 207, 208 may possibly be used. For example, incorrect pairings of colored and physical coding means 207, 208 may thus be detected in order to detect incorrectly manufactured cable harnesses. The physical coding means 208 may comprise e.g. elevations, holes, etc. that are able to be recognized by scanning.

Figure 4:
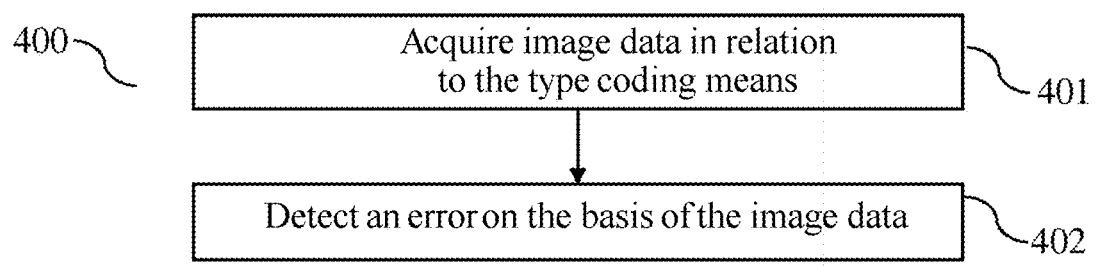
FIG. 4 shows a flow chart of an exemplary method for checking a cable harness for an on-board power system of a vehicle.

FIG. 4 shows a flowchart of an exemplary method 400 for checking a cable harness for an on-board power system of a vehicle. The cable harness comprises a multiplicity of cables and a corresponding multiplicity of different cable-side interface units 110. In this case, the different cable-side interface units 110 have different colored and/or physical type coding means 207, 208. The colored and/or physical type coding means 207, 208 are configured such that the type coding of the cable-side interface units 110 are externally detectable or recognizable or acquirable.

The method 400 comprises acquiring 401 image data in relation to the colored and/or physical type coding means 207, 208 of the multiplicity of different cable-side interface units 110. For this purpose, the cable harness with the multiplicity of different cable-side interface units 110 may be acquired by an image camera. The method 400 furthermore comprises detecting 402 an error in the cable harness on the basis of the image data. It may in particular be detected that one or more cable-side interface units 110 have incorrect colored and/or physical type coding means 207, 208.

Particularly advantageously, the colored and/or physical type coding means 207, 208 of the cable-side interface units 110 may each comprise at least a colored type coding means 207 and a physical type coding means 208 that together form a pair of coding means. Detecting 402 an error in the cable harness may then comprise detecting an incorrect pair of coding means in which a colored type coding means 207 does not match the physical type coding means 208.

The type coding, described in this document, of interface units 110 allows a quick, safe and simple installation of plug systems 100. In this case, in particular, a cone 205, 206 used to fix the cable 111 may be used in an economically efficient and reliable manner to make the type coding externally visible. Furthermore, the described type coding may be used to efficiently and reliably detect errors in the manufacture of a cable harness.

The present invention is not limited to the exemplary embodiments shown. It should be borne in mind in particular that the description and the figures are only intended to illustrate the principle of the proposed methods, devices and systems.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A cable-side interface unit for a plug system for transmitting electric power in a high-voltage on-board power system of a vehicle, wherein the plug system comprises the cable-side interface unit and a specific component-side interface unit that are able to be plugged together to produce a plug connection, wherein the cable-side interface unit comprises:
    one or more power contact parts configured to transmit electric power and to make contact with corresponding power contact parts of the specific component-side interface unit;
    a housing configured to at least partly enclose the one or more power contact parts of the cable-side interface unit and to fix a cable to the cable-side interface unit, wherein the cable comprises lines that are electrically conductively connected to the one or more power contact parts of the cable-side interface unit inside the housing; and
    colored and/or physical type coding arranged on an outer wall of the housing identifying the specific component-side interface unit of the plug system from a plurality of different component-side interface units of the on-board power system;
    wherein the housing comprises fixing means for fixing the cable to the cable-side interface unit;
    wherein the colored and/or physical type coding is arranged on the fixing means for fixing the cable to the cable-side interface unit;
    wherein the fixing means for fixing the cable to the cable-side interface unit has two cones that are plugged into one another and have a complementary profile along a direction of extent of the cable; and
    wherein the colored and/or physical type coding is arranged on at least one of the cones.

2. The cable-side interface unit as claimed in claim 1, wherein the fixing means for fixing the cable to the cable-side interface unit clamps the cable to a cable-side end of the housing.

3. The cable-side interface unit as claimed in claim 1, wherein
    an inner wall of the housing encloses the cable at the cable-side end of the housing;
    the two cones comprise an outer cone and an inner cone;
    an outer wall of the outer cone bears on the inner wall of the housing;
    an inner wall of the outer cone widens toward the cable-side end of the housing;
    an inner wall of the inner cone bears on an outer wall of the cable; and
    an outer wall of the inner cone runs in a manner complementary to the inner wall of the outer cone, such that a press fit is formed between the cable and the housing when the inner cone is inserted into the outer cone.

4. The cable-side interface unit as claimed in claim 3, wherein
    the inner cone has an externally visible ring that encloses the cable; and
    the colored and/or physical type coding is arranged on the ring.

5. The cable-side interface unit as claimed in claim 1, wherein at least one of:
    the housing and the one or more power contact parts of the cable-side interface unit form a first space that is enclosed by the housing and open toward a front side of the cable-side interface unit and that corresponds to an open second space of the specific component-side interface unit so as to produce the plug connection;

a shape of the first space forms physical type coding, such that the cable-side interface unit is not able to produce a plug connection with other interface units of the multiplicity of different component-side interface units; and/or colored type coding is arranged inside the first space.

6. A method for checking a cable harness for an on-board power system of a vehicle, wherein the cable harness comprises a plurality of cables and a corresponding plurality of different cable-side interface units, wherein each of the plurality of different cable-side interface units comprises:

one or more power contact parts configured to transmit electric power;

a housing configured to at least partly enclose the one or more power contact parts and to fix a cable to the cable-side interface unit, wherein the cable comprises lines that are electrically conductively connected to the one or more power contact parts inside the housing; and colored and/or physical type coding arranged on an outer wall of the housing;

wherein the housing comprises fixing means for fixing the cable to the cable-side interface unit;

wherein the colored and/or physical type coding is arranged on the fixing means for fixing the cable to the cable-side interface unit;

wherein the fixing means for fixing the cable to the cable-side interface unit has two cones that are plugged into one another and have a complementary profile along a direction of extent of the cable; and wherein the colored and/or physical type coding is arranged on at least one of the cones; and wherein the method comprises:

acquiring image data in relation to the colored and/or physical type coding of the plurality of different cable-side interface units; and detecting an error in the cable harness on the basis of the image data.

7. The method as claimed in claim 6, wherein the colored and/or physical type coding of a cable-side interface unit comprise at least a colored type coding and a physical type coding that together form a pair of coding, and wherein the detecting the error in the cable harness further comprises detecting an incorrect pair of coding in which the colored type coding does not match the physical type coding.

\* \* \* \* \*